United States Patent [19]

Kasper et al.

[11] 4,222,973

[45] Sep. 16, 1980

[54] PROCESS FOR PRODUCING CASTING RELEASE PAPER AND PRODUCT

[75] Inventors: Klaus B. Kasper; John A. Hill, III, both of Pulaski, N.Y.

[73] Assignee: The Mead Corporation, Dayton, Ohio

[21] Appl. No.: 922,975

[22] Filed: Jul. 10, 1978

Related U.S. Application Data

[63] Continuation of Ser. No. 742,097, Nov. 16, 1976, abandoned.

[51] Int. Cl.$^2$ .............................................. B29D 7/02
[52] U.S. Cl. .................................... 264/22; 264/255; 264/331; 264/338
[58] Field of Search .................. 264/255, 22, 338, 331

[56] References Cited

U.S. PATENT DOCUMENTS

| 2,780,574 | 2/1957 | Ott et al. ........................... 264/255 X |
| 2,799,609 | 7/1957 | Dalton .............................. 264/255 X |
| 2,883,315 | 4/1959 | Palmquist ......................... 264/255 X |
| 2,912,348 | 11/1959 | Lavanchy . |
| 2,922,723 | 1/1960 | Lavanchy . |
| 3,067,054 | 12/1962 | Reese . |
| 3,331,729 | 7/1967 | Danielson et al. . |
| 3,411,908 | 11/1968 | Crawford et al. . |
| 3,519,456 | 7/1970 | Reed et al. . |
| 3,873,390 | 3/1975 | Cornell et al. . |
| 3,896,249 | 7/1975 | Keeling et al. . |
| 3,952,131 | 4/1976 | Sideman . |
| 4,020,215 | 4/1977 | Michaylov . |

Primary Examiner—Philip Anderson
Attorney, Agent, or Firm—Stephen H. Cagle; Charles N. Shane, Jr.; Wilson G. Palmer

[57] ABSTRACT

A process is provided for the preparation of a release paper for casting thermoplastic films comprising applying an aqueous coating composition containing an adhesion primer to at least one surface of a paper substrate, and drying the coated substrate. Thereafter, applying a molten film of a low density polyethylene over the coated surface, the molten film of low density polyethylene having an extrusion melt temperature of from about 425° F. to about 575° F., adhering the low density polyethylene film to the coated surface and cooling the low density polyethylene film to a temperature below the melt point of the low density polyethylene. A release paper for casting thermoplastic films is produced comprising a paper substrate and a layer of low density polyethylene adhered to at least one surface of the paper substrate. The polyethylene layer is adhered to the paper substrate by a layer of an adhesion primer. The low density polyethylene has a density of from about 0.917 grams per cubic centimeter to about 0.930 grams per cubic centimeter and the low density polyethylene is applied to the paper substrate at a temperature of from about 425° F. to about 575° F.

8 Claims, No Drawings

PROCESS FOR PRODUCING CASTING RELEASE PAPER AND PRODUCT

This is a continuation of application Ser. No. 742,097, filed Nov. 16, 1976, now abandoned.

BACKGROUND OF THE INVENTION

This invention relates to an improved process for the production of release papers for the casting of organic thermoplastic film organic solvent solutions. A preferred use of the paper of the invention is for the casting of polyvinylbutyral film, which film may be used in preparing reflective products such as highway signs.

Release or stripping papers have long been used for the casting of sheets, films or transfers of thermoplastic resins. Conventionally, the papers have been coated with a release agent, such as a silicone, starch, silicate or the like which provides a release layer between the cast plastic surface and the paper. Thus, as in the conventional casting process, solvent solutions of thermoplastic resins could be coated on the release coated paper, dried to remove the solvent, and then dried film or sheet could be easily stripped from the release surface. The surface of the thermoplastic resin film is a replicate of the release surface. Endless sheets or films of the thermoplastic resin can be produced, if desired, by this technique. Typical examples of coated release papers are disclosed in the following patents.

U.S. Pat. No. 3,067,054—(1962) to Reese
U.S. Pat. No. 3,331,729—(1967) to Danielson et al.
U.S. Pat. No. 3,519,456—(1970) to Reed et al.
U.S. Pat. No. 3,873,390—(1975) to Cornell et al.
U.S. Pat. No. 3,896,249—(1975) to Keeling et al.
U.S. Pat. No. 3,952,131—(1976) to Sideman.

U.S. Pat. No. 3,519,456 discloses various types of papers, including glassine, vegetable parchment and kraft, coated or impregnated with a cured siloxane or Werner type chromium complex, or polyethylene, tetrafluoroethylene or polypropylene plastic film as a carrier sheet for casting a transferable ink composition. U.S. Pat. No. 3,873,398 discloses a silicone coated release paper for use in, for example, the production of reflective thermoplastic sheets for use in highway signs. Stripping or release papers having a polyethylene coating and being further coated with a release agent are disclosed in U.S. Pat. Nos. 3,331,729, 3,896,249 and 3,952,131. U.S. Pat. No. 3,067,054 discloses the use of paper coated with low molecular weight (MW = 12,000 to 20,000) polyethylene for solution casting of certain vinyl thermoplastic resin films.

Recently, attempts have been made to produce a polyethylene extrusion coated paper which could be used in casting thermoplastic films such as polybutyral films. Polyethylene coated papers are conventionally produced by continuously extruding a hot film of polyethylene from an extruder and adhering the film of polyethylene while still hot to a paper substrate by passing the hot film and paper substrate through a nip of a pair of press rolls. Extrusion melt temperatures of 575° F. or above are conventionally used in this process. Cooling of the adhered film was accomplished by maintaining the roll contacting the hot film at a cool temperature. Polyethylene coated papers made by such conventional methods did not have good release properties for cast polyvinylbutyral films and in some cases attempts to strip the polyvinylbutyral film from the release paper would delaminate the polyethylene release layer from the paper. By (1) lowering of the temperature of the polyethylene melt, (2) compensating for the loss of adhesion between the paper and the polyethylene film due to lower extrusion temperatures by applying a layer of an adhesion primer to the paper substrate and (3) extrusion coating with a low density polyethylene, as by the process of this invention, a paper having excellent release properties can be produced. This release paper has a mirrorlike release surface free of defects and can be used in particular where a cast film requires a reflective surface as in the production of, for example, highway reflective signs.

STATEMENT OF THE INVENTION

In accordance with one aspect of this invention, a process is provided for the preparation of a release paper for casting thermoplastic films comprising applying an aqueous coating composition containing an adhesion primer to at least one surface of a paper substrate, and drying the coated substrate. Thereafter, applying a molten film of a low density polyethylene over the coated surface, the molten film of low density polyethylene having an extrusion melt temperature of from about 425° F. to about 575° F., adhering the low density polyethylene film to the coated surface and cooling the low density polyethylene film to a temperature below the melt point of the low density polyethylene.

In accordance with another aspect of this invention, a release paper for casting thermoplastic films is produced comprising a paper substrate and a layer of low density polyethylene adhered to at least one surface of the paper substrate. The polyethylene layer is adhered to the paper substrate by a layer of an adhesion primer. The low density polyethylene has a density of from about 0.917 grams per cubic centimeter to about 0.930 grams per cubic centimeter and the low density polyethylene is applied to the paper substrate at a temperature of from about 425° F. to about 575° F.

DETAILED DESCRIPTION OF THE INVENTION

The substrate for the release paper of this invention is preferably an uncoated paper containing predominately high strength, such as kraft or sulfite, fibers. The paper is preferably internally sized on the papermachine to prevent delamination or splitting of the paper during use as a stripping paper. The thickness of the paper is not critical, being determined by the strength requirements as a release paper. A 4 to 10 mil paper, machine finished to a Sheffield smoothness of from about 60 to about 90 is preferred.

The paper substrate is coated with a layer of an adhesion primer to adhere the polyethylene to the paper. Details of such a process using aluminum oxide particles as the adhesion primer are disclosed in commonly-assigned co-pending application Ser. No. 623,679, filed Oct. 20, 1975 and entitled, "Polyolefin Photographic Base and Method of Producing" which is incorporated herein by reference.

Aluminum oxide particles having a particle size from about 1 millimicron to about 60 millimicrons perform satisfactorily as the preferred adhesion primer in this invention. The more preferred particle size range for the aluminum oxide is from about 5 millimicrons to about 20 millimicrons. Aluminum oxide particles commercially available in this range of sizes are Aluminum Oxide C and Q-LOID A-30 both of which have been found to give a good bond between the substrate and polyethylene. Aluminum Oxide C is produced by flame hydrolysis of anhydrous aluminum chloride by Degussa, Inc. of New York, N.Y. and is sold by them as a water dispersable powder of aluminum oxide particles having an average particle size of about 20 millimicrons. Q-LOID A-30 is a mildly acid aqueous dispersion containing 30% aluminum oxide particles having an average particle size of about 5 millimicrons and is produced and sold by Philadelphia Quartz Company of Valley Forge, Penn.

The aluminum oxide particles are preferably applied to the paper substrate as a dilute slurry of the particles in water at one or more size presses on the papermachine, but may be coated in a separate coating operation, if desired. Application may be by any method whereby a thin slurry of aluminum oxide particles can be evenly applied to paper.

In general, the amount of aluminum oxide required to give good adhesion of the polyethylene film to the paper depends on the roughness of the paper, the thickness of the polyethylene film, the type of polyethylene film, the temperature of the extruded polyethylene film, the pressure in the cooling nip and the speed of the paper substrate web. For example, at 100 feet per minute, treatment of the paper surface with 0.17 grams per square meter of aluminum oxide will noticeably improve the adhesion of the polyethylene to the paper surface. A preferred range of aluminum oxide addition is from about 0.25 grams per square meter to about 0.60 grams pe r square meter and a most preferred range is from about 0.45 grams per square meter to about 0.50 grams per square meter of paper. At the most preferred range, coating speeds up to 450 feet per minute have been consistently obtained with good adhesion of the polyethylene to the paper surface.

Although the thin coatings of aluminum oxide do not require a binder material, a binder, such as a paper coating starch can be used, if desired, in amounts up to 30% based on the weight basis of the aluminum oxide content. Above this amount the adhesion of the polyethylene film to the paper substrate is adversely affected.

The aluminum oxide coated paper may be dried by steam drums on the papermachine or by any other conventional drying method. The dried paper can be machine calendered to give a smooth surface for applying the polyethylene film. The dried paper can be further supercalendered if a smoother surface is desired.

Adhesion primers other than aluminum oxide particles can be used in the practice of this invention. Included in these primers are the colloidal silicas, hydrolyzed organic titanates, polyethylenimines, polyamides, and urea-formaldehyde resins.

A preferred colloidal silica is Ludox AM Colloidal Silica which is commercially available from du Pont, Wilmington, Del. as a 30% dispersion of the silica in water. The approximate diameter of the silica particles is 12 millimicrons. A preferred organic titanate is Tyzor TE which is a triethanolamine ester titanate available as an 80% solution of titanate in isopropanol also commercially available from du Pont. Both of these adhesion primers may be applied as dilute aqueous dispersions to the paper substrate on the papermachine in the manner of aluminum oxide. The organic titanate slowly hydrolyzes during application and drying of the paper whereby a layer of polymeric titanium dioxide coats the paper substrate.

The preferred polyethylenimine, polyamide, and urea-formaldehyde resins are commercially available in the form of water dispersable resin compositions which can be applied to the paper substrate as dilute aqueous solutions or dispersions and dried to give a layer of the resin.

In a preferred embodiment of this invention, the coated surface of the adhesion primer coated paper is treated with a corona discharge in a manner well known in the art, such as the method disclosed in U.S. Pat. No. 3,411,908 issued Nov. 19, 1968 to I. H. Crawford et al. A four roll treater station in which the coat paper is sequentially exposed on each of the four rolls to a single corona discharge has been found to be satisfactory. The corona is powered by a generator with an input of 78,000 volt-amperes and an output of 30,000 volts and 30 megahertz obtained from Softal Electronics Dmbh, Hamburg, West Germany.

As in conventional continuous extrusion coating methods, a hot polyethylene film from the extruder can be applied to the adhesion primer coated paper substrate and the hot film may be simultaneously adhered and cooled by running the film coated paper substrate through a pressure nip between a chill roll and a rubber press roll.

Low density commercial extrusion coating grades of polyethylene have been used successfully in the practice of this invention. For purposes of this invention, the low density polyethylene resins useful in this invention are those having a density in the range of from about 0.917 grams per cubic centimeter to about 0.930 grams per cubic centimeter. Higher density polyethylene resins, those above a density of 0.930 grams per cubic centimeter, have release properties equal to the lower density polyethylene resins. However, the high density resins apparently crystallize on exposure to the high temperatures reached during processing of the cast thermoplastic film. This results in thermoplastic film having a matte finish instead of a reflective mirrorlike finish. Examples of commercial resins which can be used are the polyethylene resins identified as Gulf Oil Company's 4516 and 1018 resins.

The extrusion coating process, in which an extruder is used to apply the polyethylene film, is conventional except for the extrusion melt temperature, that is, the temperature of the extruded polyethylene just before the extrusion die. Conventionally, the extrusion melt temperature for extrusion coating of polyethylenes is from about 600° F. to about 620° F. At this temperature, the polyethylene surface of the resultant extrusion coated paper does not release the cast thermoplastic film properly, and the film cannot be conveniently stripped from the polyethylene coated paper. Extrusion melt temperatures in the range of about 425° F. to about 575° F. do not hurt the release properties of the polyethylene coated paper and satisfactory release papers can be obtained at reasonable extrusion coating speeds. A preferred range of extrusion melt temperatures is from about 525° F. to about 550° F. while a most preferred range is from about 525° F. to about 530° F. The preferred chill roll temperature is from about 50° F. to about 90° F. and the preferred cooling nip pressure is from about 70 pounds to about 130 pounds per lineal inch. The thickness of the polyethylene film may be from about 0.5 mils to about 4 mils, with the preferred thickness being about 2 mils.

In a more preferred embodiment of this invention, the polyethylene coating contains about 1% of about 7%, preferably about 2% to about 3%, aluminum metal pigment. The amounts are percent by weight based on the total weight of the pigmented polyethylene film. Inclusion of this amount of aluminum metal pigment provides a reflective surface of the polyethylene coated release paper which permits monitoring of the cast thermoplastic film for film thickness and evenness of the film. The aluminum metal pigment may be added to the polyethylene by known methods in which a preblended masterbatch, for example, of 50% polyethylene and 50% aluminum metal pigment, is supplied to the extruder as needed along with the low density polyethylene to give the desired aluminum metal pigment content.

The following example illustrates a preferred embodiment of this invention.

EXAMPLE

An 8 mil paper substrate was prepared by refining a mixture of 20% softwood kraft and 80% hardwood kraft to a Canadian Standard Freeness of 390 to 460, adding to the refined pulp, 6 pounds per ton of a cationic starch (Cato 15) and the paper was formed and dried on a papermachine. While still on the papermachine, the paper was run through three size presses followed each time by drying. At the first size press, the paper was treated with an aqueous solution of 6% paper coating starch. At each of the second and third size presses, the paper was treated with an aqueous dispersion containing 1.8% aluminum oxide (Q-LOID A30-Philadelphia Quartz Co.). The total pick up of aluminum oxide was approximately 0.43 grams of the oxide per side. The paper was machine calendered on the papermachine to give a smooth surface for subsequent coatings. The Sheffield smoothness was about 75. The aluminum oxide coated side of the paper was treated with a corona discharge using the four roll treater station described supra.

Paper produced as above was coated at about 450 feet per minute on one side with 2 mils of a low density polyethylene containing 2% aluminum metal pigment using an extruder. The melt temperature of the polyethylene from the extruder was 525° F., the gloss chill roll was kept at 70° F., and the nip pressure between the chill roll and the pressure roll was 120 pounds per lineal inch.

Release paper so produced was coated with about 1.5 mil dried polyvinylbutyral film using a 20% solution of polyvinylbutyral in 80% methanol-20% toluene solvent. The polyvinylbutyral coated release paper was dried at 180° F. for ten minutes, followed by baking at 280° F. for ten minutes. After cooling to room temperature the polyvinylbutyral film was easily stripped from the release paper.

The release paper produced by the process of this invention can be used for producing cast sheets, films or transfers of thermoplastic resins in addition to the polyvinylbutyral films illustrated in the example. Organic solutions of, for example, acrylates, methacrylate, vinyl chloride, styrene, vinyl chloride-vinyl acetate copolymers and polyesters may be cast on the polyethylene surface so long as the organic solvent used does not react with or dissolve the polyethylene coating of the release paper at the drying temperatures of the casting solvent.

What is claimed is:

1. A process for the preparation of a cast thermoplastic film having a mirrorlike surface for use in the manufacture of reflective signs comprising the steps of:
   (a) applying an aqueous coating composition to at least one surface of a paper substrate, said aqueous coating composition comprising an adhesion primer dispersed in water,
   (b) drying said coated substrate,
   (c) applying a molten film of at least 0.5 mils of a low density polyethylene over said coated surface, said molten film of low density polyethylene having an extrusion melt temperature of from about 425° F. to about 575° F., said low density polyethylene having a density of about 0.917 grams per cubic centimeter to about 0.930 grams per cubic centimeter,
   (d) adhering said low density polyethylene film to said coated surface,
   (e) cooling said low density polyethylene film to a temperature below the melt point of said low density polyethylene to form a release paper having a low density polyethylene surface,
   (f) applying a solution comprising an organic solvent and a thermoplastic resin soluble in said organic solvent to said release paper on said low density polyethylene surface,
   (g) drying said solution to remove said organic solvent and form a thermoplastic resin film on said release paper,
   (h) baking said dried thermoplastic resin film on said release paper to remove traces of said solvent, and thereafter,
   (i) stripping said baked thermoplastic resin film from said release paper,
   whereby a thermoplastic film having a mirrorlike surface is obtained.

2. The process of claim 1 wherein said adhesion primer is selected from the group consisting of aluminum oxide particles, colloidal silicas, hydrolyzed organic titanates, polyethylenimines, polyamides and urea-formaldehyde resins.

3. The process of claim 1 wherein said low density polyethylene film has a thickness of from about 0.5 mils to about 4 mils.

4. The process of claim 1 wherein said molten film of low density polyethylene has an extrusion melt temperature of from about 525° F. to about 550° F.

5. The process of claim 1 wherein said low density polyethylene contains from about 1% to about 7% by weight of aluminum metal pigment based on the total weight of said low density polyethylene film.

6. The process of claim 1 wherein said baking is accomplished at a temperature of at least 280° F.

7. A process for the preparation of a cast thermoplastic film having a mirrorlike surface for use in the manufacture of reflective signs comprising the steps of:
   (a) applying an aqueous coating composition to at least one surface of a paper substrate, said coating composition comprising aluminum oxide particles dispersed in water, said aluminum oxide particles having a particle size of from about 1 millimicron to about 60 millimicrons, said aluminum oxide particles being applied to said surface at a coat weight of from about 0.25 grams per square meter to about 0.60 grams per square meter,
   (b) drying said coated substrate, and calendering said surface of said dried coated substrate to a Sheffield smoothness of from about 60 to about 90,
   (c) treating said coated, calendered surface of said dried substrate with a corona discharge,
   (d) applying a molten film of at least 0.5 mils of a low density polyethylene over said treated coated surface, said molten film of low density polyethylene having a melt temperature from about 525° F. to about 550° F., said low density polyethylene having a density of from about 0.917 grams per cubic centimeter to about 0.930 grams per cubic centimeter, said low density polyethylene containing from about 1% to about 7% by weight of aluminum metal pigment based on the total weight of said low density polyethylene film, (e) adhering said low density polyethylene film to said coated surface, (f) cooling said low density polyethylene film to a temperature below the melt point of said low density polyethylene to form a release paper having a low density polyethylene surface, (g) applying a solution comprising an organic solvent and a thermoplastic resin soluble in said organic solvent to said release paper on said low density polyethylene surface, (h) drying said solution to remove said organic solvent and form a thermoplastic resin film on said release paper, (i) baking said dried thermoplastic resin film on said release paper to remove traces of said solvent, and thereafter, (j) stripping said baked thermoplastic resin film from said release paper, whereby a thermoplastic film having a mirrorlike surface is obtained.

8. The process of claim 7 wherein said thermoplastic resin is polyvinylbutyral.

* * * * *